(12) United States Patent
Nathan et al.

(10) Patent No.: US 8,249,959 B2
(45) Date of Patent: *Aug. 21, 2012

(54) COMMUNICATIONS TECHNIQUES FOR AN INTELLIGENT DIGITAL AUDIOVISUAL REPRODUCTION SYSTEM

(75) Inventors: Guy Nathan, Yerres (FR); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,842

(22) Filed: Feb. 13, 2012

(65) Prior Publication Data

US 2012/0143732 A1 Jun. 7, 2012

Related U.S. Application Data

(63) Continuation of application No. 12/805,437, filed on Jul. 30, 2010, now Pat. No. 8,145,547, which is a continuation of application No. 09/902,707, filed on Jul. 12, 2001, now Pat. No. 7,793,331, which is a continuation of application No. 08/817,528, filed on Aug. 5, 1997, now Pat. No. 6,308,204.

(30) Foreign Application Priority Data

Oct. 12, 1994 (WO) .................... PCT/FR94/01185
Jul. 11, 1995 (FR) ...................................... 95 08391

(51) Int. Cl.
*G07B 17/00* (2006.01)
*G07F 19/00* (2006.01)
*G06F 9/44* (2006.01)
*G06F 9/445* (2006.01)

(52) U.S. Cl. .............. 705/30; 717/174; 717/168; 221/3; 221/9

(58) Field of Classification Search ................. 717/168, 717/174, 103, 152; 340/4.4, 5.9, 5.85; 711/103, 711/152; 709/221, 226, 232; 386/230

See application file for complete search history.

(56) References Cited

U.S. PATENT DOCUMENTS 3,807,541 A 4/1974 Kortenhaus
(Continued)

FOREIGN PATENT DOCUMENTS

AU 199954012 4/2000
(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.
(Continued)

*Primary Examiner* — Matthew Gart
*Assistant Examiner* — Olusegun Goyea
(74) *Attorney, Agent, or Firm* — Nixon & Vanderhye PC

(57) ABSTRACT

Method for communication between a central server and a computerized juke-box which operates in a conference mode, including: sending a header before any transaction, which includes the identity of the destination together, the identity of the emitter, and the size of the packets; responding from the server in the form of a data packet, each packet sent by the server being encoded using the identification code of the juke-box software; and receiving a data packet by the juke-box, which decodes the packet, simultaneously performs a check on the data received by the CRC method and sends an acknowledgement of receipt to the server indicating the accuracy of the information received, to allow it to prepare and send another packet to the juke-box.

18 Claims, 8 Drawing Sheets

U.S. PATENT DOCUMENTS

| | | |
|---|---|---|
| 3,982,620 A | 9/1976 | Kortenhaus |
| 4,008,369 A | 2/1977 | Theurer et al. |
| 4,186,438 A | 1/1980 | Benson et al. |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam et al. |
| 4,413,260 A | 11/1983 | Siegel et al. |
| 4,521,014 A | 6/1985 | Sitrick |
| 4,528,643 A | 7/1985 | Freeny, Jr. |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza et al. |
| 4,588,187 A | 5/1986 | Dell |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples, Jr. et al. |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa et al. |
| 4,924,378 A | 5/1990 | Hershey |
| 4,926,485 A | 5/1990 | Yamashita |
| 4,937,807 A | 6/1990 | Weitz et al. |
| 4,949,187 A | 8/1990 | Cohen |
| 4,953,159 A | 8/1990 | Hayden et al. |
| 4,956,768 A | 9/1990 | Sidi et al. |
| 4,958,835 A | 9/1990 | Tashiro et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru et al. |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A * | 5/1992 | Vogel ............................ 386/230 |
| 5,138,712 A | 8/1992 | Corbin |
| 5,148,159 A | 9/1992 | Clark et al. |
| 5,155,847 A | 10/1992 | Kirouac et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A * | 5/1993 | Beaverton et al. ............. 717/174 |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A * | 1/1994 | Servi ............................. 713/183 |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A * | 8/1994 | Frank et al. ..................... 710/48 |
| 5,355,302 A * | 10/1994 | Martin et al. ................. 700/234 |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A * | 4/1995 | Nilsson et al. ................. 717/168 |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A * | 8/1995 | Bacon et al. .................. 380/242 |
| 5,444,499 A | 8/1995 | Saitoh |
| 5,445,295 A * | 8/1995 | Brown ............................. 221/3 |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A * | 5/1996 | Fujinami et al. .............. 370/543 |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |

| | | | | | | |
|---|---|---|---|---|---|---|
| 5,555,244 | A | 9/1996 | Gupta | 5,790,172 | A | 8/1998 | Imanaka |
| 5,557,541 | A | 9/1996 | Schulhof | 5,790,671 | A | 8/1998 | Cooper |
| 5,557,724 | A | 9/1996 | Sampat et al. | 5,790,856 | A | 8/1998 | Lillich |
| 5,559,505 | A | 9/1996 | McNair | 5,793,364 | A | 8/1998 | Bolanos et al. |
| 5,559,549 | A | 9/1996 | Hendricks | 5,793,980 | A | 8/1998 | Glaser |
| 5,561,709 | A | 10/1996 | Remillard | 5,798,785 | A | 8/1998 | Hendricks |
| 5,565,908 | A | 10/1996 | Ahmad | 5,802,283 | A | 9/1998 | Grady et al. |
| 5,566,237 | A | 10/1996 | Dobbs | 5,802,599 | A | 9/1998 | Cabrera |
| 5,570,363 | A | 10/1996 | Holm | 5,805,804 | A | 9/1998 | Laursen et al. |
| 5,578,999 | A | 11/1996 | Matsuzawa et al. | 5,808,224 | A | 9/1998 | Kato |
| 5,579,404 | A | 11/1996 | Fielder et al. | 5,809,246 | A | 9/1998 | Goldman |
| 5,583,561 | A | 12/1996 | Baker et al. | 5,812,643 | A | 9/1998 | Schelberg et al. |
| 5,583,937 | A | 12/1996 | Ullrich et al. | 5,815,146 | A | 9/1998 | Youden et al. |
| 5,583,994 | A | 12/1996 | Rangan | 5,825,884 | A | 10/1998 | Zdepski et al. |
| 5,583,995 | A | 12/1996 | Gardner et al. | 5,831,555 | A | 11/1998 | Yu et al. |
| 5,592,482 | A | 1/1997 | Abraham | 5,831,663 | A | 11/1998 | Waterhouse et al. |
| 5,592,551 | A | 1/1997 | Lett | 5,832,024 | A | 11/1998 | Schotz et al. |
| 5,592,611 | A | 1/1997 | Midgely et al. | 5,832,287 | A | 11/1998 | Atalla |
| 5,594,509 | A | 1/1997 | Florin | 5,835,843 | A | 11/1998 | Haddad |
| 5,596,702 | A | 1/1997 | Stucka et al. | 5,842,869 | A | 12/1998 | McGregor et al. |
| 5,612,581 | A | 3/1997 | Kageyama | 5,845,104 | A | 12/1998 | Rao |
| 5,613,909 | A | 3/1997 | Stelovsky | 5,845,256 | A | 12/1998 | Pescitelli et al. |
| 5,616,876 | A | 4/1997 | Cluts | 5,848,398 | A | 12/1998 | Martin |
| 5,617,565 | A | 4/1997 | Augenbraun et al. | 5,851,149 | A | 12/1998 | Xidos et al. |
| 5,619,247 | A | 4/1997 | Russo | 5,854,887 | A | 12/1998 | Kindell |
| 5,619,249 | A | 4/1997 | Billock et al. | 5,857,020 | A | 1/1999 | Peterson |
| 5,619,250 | A | 4/1997 | McClellan et al. | 5,857,707 | A | 1/1999 | Devlin |
| 5,619,698 | A | 4/1997 | Lillich | 5,862,324 | A | 1/1999 | Collins |
| 5,623,666 | A | 4/1997 | Pike | 5,864,811 | A | 1/1999 | Tran et al. |
| 5,631,693 | A | 5/1997 | Wunderlich et al. | 5,864,868 | A | 1/1999 | Contois |
| 5,636,276 | A | 6/1997 | Brugger | 5,864,870 | A | 1/1999 | Guck |
| 5,638,426 | A | 6/1997 | Lewis | 5,867,714 | A | 2/1999 | Todd |
| 5,642,337 | A | 6/1997 | Oskay et al. | 5,870,721 | A | 2/1999 | Norris |
| 5,644,714 | A | 7/1997 | Kikinis | 5,880,386 | A | 3/1999 | Wachi et al. |
| 5,644,766 | A | 7/1997 | Coy | 5,880,769 | A | 3/1999 | Nemirofsky et al. |
| 5,654,714 | A | 8/1997 | Takahashi et al. | 5,884,028 | A | 3/1999 | Kindell |
| 5,659,466 | A | 8/1997 | Norris et al. | 5,884,298 | A | 3/1999 | Smith |
| 5,661,517 | A | 8/1997 | Budow et al. | 5,887,193 | A | 3/1999 | Takahashi |
| 5,661,802 | A | 8/1997 | Nilssen | 5,896,094 | A | 4/1999 | Narisada et al. |
| 5,663,756 | A | 9/1997 | Blahut et al. | 5,903,266 | A | 5/1999 | Berstis et al. |
| 5,668,592 | A | 9/1997 | Spaulding | 5,913,040 | A | 6/1999 | Rakavy |
| 5,668,778 | A | 9/1997 | Quazi | 5,914,712 | A | 6/1999 | Sartain et al. |
| 5,668,788 | A | 9/1997 | Allison | 5,915,094 | A | 6/1999 | Kouloheris |
| 5,675,734 | A | 10/1997 | Hair | 5,915,238 | A | 6/1999 | Tjaden |
| 5,680,533 | A | 10/1997 | Yamato et al. | 5,917,537 | A | 6/1999 | Lightfoot |
| 5,684,716 | A | 11/1997 | Freeman | 5,917,835 | A | 6/1999 | Barrett |
| 5,689,641 | A | 11/1997 | Ludwig | 5,918,213 | A | 6/1999 | Bernard et al. |
| 5,691,778 | A | 11/1997 | Song | 5,920,700 | A | 7/1999 | Gordon et al. |
| 5,691,964 | A | 11/1997 | Niederlein et al. | 5,920,702 | A | 7/1999 | Bleidt et al. |
| 5,696,914 | A | 12/1997 | Nahaboo et al. | 5,923,885 | A | 7/1999 | Johnson |
| 5,697,844 | A | 12/1997 | Von Kohorn | 5,926,531 | A | 7/1999 | Petite |
| 5,703,795 | A | 12/1997 | Mankovitz | 5,930,765 | A | 7/1999 | Martin |
| 5,708,811 | A | 1/1998 | Arendt | 5,931,908 | A | 8/1999 | Gerba |
| 5,712,976 | A | 1/1998 | Falcon | 5,933,090 | A | 8/1999 | Christenson |
| 5,713,024 | A | 1/1998 | Halladay | 5,940,504 | A | 8/1999 | Griswold |
| 5,715,416 | A | 2/1998 | Baker | 5,949,411 | A | 9/1999 | Doerr et al. |
| 5,717,452 | A | 2/1998 | Janin et al. | 5,949,688 | A | 9/1999 | Montoya |
| 5,721,583 | A | 2/1998 | Harada et al. | 5,953,429 | A | 9/1999 | Wakai et al. |
| 5,721,815 | A | 2/1998 | Ottesen et al. | 5,956,716 | A | 9/1999 | Kenner et al. |
| 5,721,829 | A | 2/1998 | Dunn et al. | 5,959,869 | A | 9/1999 | Miller |
| 5,724,525 | A | 3/1998 | Beyers et al. | 5,959,945 | A | 9/1999 | Kleiman |
| 5,726,909 | A | 3/1998 | Krikorian | 5,963,916 | A | 10/1999 | Kaplan |
| 5,734,719 | A | 3/1998 | Tsevdos | 5,966,495 | A | 10/1999 | Takahashi |
| 5,734,961 | A | 3/1998 | Castille | 5,978,855 | A | 11/1999 | Metz |
| 5,739,451 | A | 4/1998 | Winksy et al. | 5,978,912 | A | 11/1999 | Rakavy et al. |
| 5,743,745 | A | 4/1998 | Reintjes | 5,980,261 | A | 11/1999 | Mino et al. |
| 5,745,391 | A | 4/1998 | Topor | 5,999,499 | A | 12/1999 | Pines et al. |
| 5,748,254 | A | 5/1998 | Harrison et al. | 5,999,624 | A | 12/1999 | Hopkins |
| 5,748,468 | A | 5/1998 | Notenboom et al. | 6,002,720 | A | 12/1999 | Yurt |
| 5,751,336 | A | 5/1998 | Aggarwal et al. | 6,005,599 | A | 12/1999 | Asai et al. |
| 5,757,936 | A | 5/1998 | Lee | 6,008,735 | A | 12/1999 | Chiloyan et al. |
| 5,758,340 | A | 5/1998 | Nail | 6,009,274 | A | 12/1999 | Fletcher |
| 5,761,655 | A | 6/1998 | Hoffman | 6,011,758 | A | 1/2000 | Dockes et al. |
| 5,762,552 | A | 6/1998 | Vuong | 6,018,337 | A | 1/2000 | Peters |
| 5,774,527 | A | 6/1998 | Handelman et al. | 6,018,726 | A | 1/2000 | Tsumura |
| 5,774,668 | A | 6/1998 | Choqiuer | 6,025,868 | A | 2/2000 | Russo |
| 5,774,672 | A | 6/1998 | Funahashi | 6,034,925 | A | 3/2000 | Wehmeyer |
| 5,781,889 | A | 7/1998 | Martin et al. | 6,038,591 | A | 3/2000 | Wolfe et al. |
| 5,786,784 | A | 7/1998 | Gaudichon | 6,040,829 | A | 3/2000 | Croy et al. |

| | | | |
|---|---|---|---|
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 * | 10/2001 | Nathan et al. ............. 709/221 |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 * | 6/2002 | Hendricks et al. .......... 725/132 |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 * | 9/2010 | Nathan et al. ............. 725/152 |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |

| | | | |
|---|---|---|---|
| 2003/0088538 A1 | 5/2003 | Ballard | |
| 2003/0093790 A1 | 5/2003 | Logan et al. | |
| 2003/0101450 A1 | 5/2003 | Davidsson et al. | |
| 2003/0104865 A1 | 6/2003 | Itkis et al. | |
| 2003/0108164 A1 | 6/2003 | Laurin et al. | |
| 2003/0135424 A1 | 7/2003 | Davis et al. | |
| 2003/0208586 A1 | 11/2003 | Mastronardi et al. | |
| 2003/0225834 A1 | 12/2003 | Lee et al. | |
| 2004/0025185 A1 | 2/2004 | Goci et al. | |
| 2004/0085334 A1 | 5/2004 | Reaney | |
| 2004/0103150 A1 | 5/2004 | Ogdon et al. | |
| 2004/0204220 A1 | 10/2004 | Fried et al. | |
| 2004/0205171 A1 | 10/2004 | Nathan et al. | |
| 2004/0220926 A1 | 11/2004 | Lamkin et al. | |
| 2005/0060405 A1 | 3/2005 | Nathan et al. | |
| 2005/0073782 A1 | 4/2005 | Nathan | |
| 2005/0086172 A1 | 4/2005 | Stefik | |
| 2005/0125833 A1 | 6/2005 | Nathan et al. | |
| 2005/0267819 A1 | 12/2005 | Kaplan | |
| 2006/0018208 A1 | 1/2006 | Nathan et al. | |
| 2006/0035707 A1 | 2/2006 | Nguyen et al. | |
| 2006/0062094 A1 | 3/2006 | Nathan et al. | |
| 2006/0239131 A1 | 10/2006 | Nathan et al. | |
| 2006/0293773 A1 | 12/2006 | Nathan et al. | |
| 2007/0121430 A1 | 5/2007 | Nathan | |
| 2007/0142022 A1 | 6/2007 | Madonna et al. | |
| 2007/0160224 A1 | 7/2007 | Nathan | |
| 2007/0204263 A1 | 8/2007 | Nathan et al. | |
| 2007/0209053 A1 | 9/2007 | Nathan | |
| 2007/0247979 A1 | 10/2007 | Brillon et al. | |
| 2008/0069545 A1 | 3/2008 | Nathan et al. | |
| 2008/0077962 A1 | 3/2008 | Nathan | |
| 2008/0086379 A1 | 4/2008 | Dion et al. | |
| 2008/0096659 A1 | 4/2008 | Kreloff et al. | |
| 2008/0137849 A1 | 6/2008 | Nathan | |
| 2008/0168807 A1 | 7/2008 | Dion et al. | |
| 2008/0171594 A1 | 7/2008 | Fedesna et al. | |
| 2008/0195443 A1 | 8/2008 | Nathan et al. | |
| 2008/0239887 A1 | 10/2008 | Tooker et al. | |
| 2009/0037969 A1 | 2/2009 | Nathan et al. | |
| 2009/0070341 A1 | 3/2009 | Mastronardi et al. | |
| 2009/0138111 A1 | 5/2009 | Mastronardi | |
| 2009/0265734 A1 | 10/2009 | Dion et al. | |
| 2009/0282491 A1 | 11/2009 | Nathan | |
| 2010/0042505 A1 | 2/2010 | Straus | |
| 2010/0211818 A1 | 8/2010 | Nathan et al. | |
| 2010/0299232 A1 | 11/2010 | Nathan et al. | |

FOREIGN PATENT DOCUMENTS

| | | |
|---|---|---|
| DE | 3406058 | 8/1985 |
| DE | 3723737 A1 | 1/1988 |
| DE | 3820835 A1 | 1/1989 |
| DE | A 3820835 | 1/1989 |
| DE | A3820835 | 1/1989 |
| DE | 3815071 | 11/1989 |
| DE | 4 244 198 | 6/1994 |
| DE | 19610739 | 9/1997 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A0283350 | 9/1988 |
| EP | 0 309 298 | 3/1989 |
| EP | A0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | A2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | A 2193420 | 2/1988 |
| GB | 2 238680 A | 6/1991 |
| GB | 2254469 | 10/1992 |
| GB | 2259398 | 3/1993 |
| GB | A2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5122282 | 5/1993 |
| JP | 5-74078 | 10/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | A9007843 | 7/1990 |
| WO | WO 91/08542 | 6/1991 |
| WO | A 9120082 | 12/1991 |
| WO | WO 93/16557 | 8/1993 |
| WO | A 9318465 | 9/1993 |
| WO | A94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 2006/014739 | 2/2006 |

OTHER PUBLICATIONS

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Derfler et al., "How Networks Work", Millennium Ed., Que Corporation, Jan. 2000.

European Search Report from EP 1 993 079.

European Search Report issued for European Application No. 08000845.1-1238/1962251, dated Apr. 3, 2009.

Gralla, "How the Internet Works", Millennium Ed., Que Corporation, Aug. 1999.

Hicks et al., "Dynamic software updating", ACM PLDI, pp. 13-23, 2001.

iTOUCH 27 New Games brochure, JVL Corporation, 2005, 2 pages.

iTouch 8 Plus brochure, JVL Corporation, 2005, 2 pages.

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Patent Abstract of Japan vol. 95, No. 010 & JP 07 281682 A (Naguo Yuasa), Oct. 27 1 JP 07 281682, figure 1-6 abrége.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, (Sep. 22, 1999).
"High-speed Opens and Shorts Substrate Tester", IBM Technical Disclosure Bulletin, vol. 33, No. 12, May 1991, pp. 251-259.
Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments" IBM Technical Disclosure Bulletin, vol. 32, No. 9A, Feb. 1990, pp. 141-143.
"Darts Revolution Again", Replay Magazine, Mar. 1991, pp. 146-148.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".

* cited by examiner

US 8,249,959 B2

COMMUNICATIONS TECHNIQUES FOR AN INTELLIGENT DIGITAL AUDIOVISUAL REPRODUCTION SYSTEM

CROSS-REFERENCE TO RELATED APPLICATIONS

This application is a continuation of U.S. application Ser. No. 12/805,437, filed Jul. 30, 2010 now U.S. Pat. No. 8,145,547, which is a continuation of U.S. application Ser. No. 09/902,707, filed Jul. 12, 2001 now U.S. Pat. No. 7,793,331, which is a continuation of U.S. application Ser. No. 08/817,528, filed Aug. 5, 1997 now U.S. Pat. No. 6,308,204, which claims priority to International Application No. PCT/FR94/01185, filed Oct. 12, 1994, and French Application No. 95/08391, filed Jul. 11, 1996, the entire contents of each of which are incorporated herein in its entirety by reference.

This application is related to our copending commonly assigned applications:

| USSN 08/817,690 | (Corres. to PCT/FR94/01185 filed Oct. 12, 1994); |
|---|---|
| USSN 08/817,689 | (Corres. to PCT/FR95/01333 filed Oct. 12, 1995); |
| USSN 08/817,968 | (Corres. to PCT/FR95/01335 filed Oct. 12, 1995); |
| USSN 08/817,437 | (Corres. to PCT/FR95/01336 filed Oct. 12, 1995) |
| USSN 08/817,426 | (Corres. to PCT/FR95/01337 filed Oct. 12, 1995); and |
| USSN 08/817,438 | (Corres. to PCT/FR95/01338 filed Oct. 12, 1995). |

BACKGROUND OF THE INVENTION

Field of the Invention

The invention relates to a communications process for a payment—triggered audiovisual reproduction system.

These audiovisual reproduction systems are generally found in cafes or pubs. This type of system is composed of a sound reproduction machine usually called a jukebox linked to a monitor which displays video images or video clips. To do this the jukebox is equipped with a compact video disk player and a compact video disk library and includes selection buttons which locate the titles of pieces of music which are available. Payment of a proper fee followed by one or more selections authorizes activation of the system with automatic loading in the player of the disk on which the selected piece is found, the desired audiovisual reproduction then being able to start.

These systems, although allowing faithful and good quality reproduction, nevertheless have major defects. Thus, a first defect relates to the space necessary for storing the library; this consequently entails that the system will have large dimensions and will be bulky. Likewise these systems which call on mostly mechanical hardware using sophisticated techniques have high fault rates; this is another defect. Finally, it is very unusual for all the pieces on a disk to be regularly heard; some are almost never played, but still cannot be eliminated. Besides this defect, the additional problems are caused by the companies which manage and distribute these systems. More particularly, placing in the circuit a limited number of identical disks and imposing a certain rotation on their customers sometimes results in an unpleasant wait for the customers when a disk is not available.

In addition, patent application PCT/WO 93 18465 discloses computerized jukeboxes which allow reception via a telecommunications network and a modem connecting the jukeboxes to the network, digital data comprising remotely loaded songs or musical pieces in a mass storage of the jukeboxes. The communications systems is likewise used for remote loading of representative files of digitized graphics information, the songs and graphics files being compressed before they are sent over the network. The jukebox processor then uses these files by decompressing them and sending the graphics data to the video circuit and the song data to the audio circuit.

However, the processor also manages the man/machine interface, and management of these different elements is done by sequentially displaying the graphics images representative of the song, then by responding to the touch action of the user, then checking that the user has paid the prescribed amounts, and finally when the required amount has been accounted, placing the selection in a queue for its subsequent performance. This system can only operate by first displaying the graphics images and then starting performance of the song because the processor cannot, according to the flowcharts, execute two tasks at one time. Finally, the graphics representations are uniquely data digitized by a scanner table of the album cover of the song. In no case does this jukebox allow display of moving images during the broadcast of the song or music. Likewise, since the processor is used for digital data decompression and processing for conversion into audio signals, it cannot consider the new actions of a user making a new selection. This is apparent, notably on page 12 of the PCT application, lines 25 to 27. Selection of new songs can only be done when the jukebox is in the attraction mode, i.e., the mode in which it displays graphics representations of different songs stored in the jukebox in succession.

U.S. Pat. No. 4,956,768 discloses a broadband server for transmitting music or images formed by a main processor communicating by a DMA channel with a hard disk and output cards, each controlled by a supplementary local processor which manages an alternative mode of access to two buffer memories A and B. Memory A is used to deliver, for example, musical data to a user, while the other is filled. Each of the output cards is connected to a consultation station, which can be local and situated in the same vicinity as the server or, alternatively, at a distance and connected by an audio or video communications network. The server receives data block-by-block and ensures that the sample parities are correct and rejects a block including more than two successive wrong samples. Each of these blocks is of course designated by a number. Once a block has been accepted, it can be stored on the local hard disk by recording its ordinal number which has no relation to its physical address on the hard disk. The consultation stations have audio and video outputs such as loudspeakers or headphones and a television monitor which makes it possible to listen to music or display images in response to requests received from terminals included in the consultation stations. In this system, the consultation stations where the first communications processor exists must have specific software for management of selection requests for musical pieces or video. It is only when the request has been made and addressed to the broadband server processor that it can transfer, under the authority of the local processor, the data in the buffer memories, such that this local processor ensures that the data are sent to the consultation stations. Moreover, it is specified that the output cards and buffer memories are filled only after having received the authorization of the local processor of the card.

Consequently, this system can only function within the framework of a multiprocessor device and does not in any way suggest use of this server for a jukebox controlled by a single processor operating in an multitask environment. This system proposed by this U.S. patent thus implements a complex process which allows delivery of a service to several consultation stations; this complex process is thus costly and incompatible with a system of jukeboxes, of which the cost and price should be as low as possible.

Moreover the process of downloading by a central site of digitized audio and video files to the local servers is accomplished via a specialized line communicating unidirectionally with the V35 interfaces of the local server, and allowing passage of 64 kilobit frames. Thus a second parallel communication must be established via the switched telephone network by a serial interface to allow exchange of service data. It is specified that it is preferable to transmit new musical pieces to the broadband server at night to leave the system free for users during the day, and that transmission can be done continuously and simultaneously for all local servers, provided that they can register continuously, i.e., at night.

This device can only work to the extent that the central server is the master and the local servers are slaved. This thus entails availability of local servers at the instant of establishing communications; this is enabled by the local servers having a double processor which relieves the communication processor for a sufficient interval. In a single—processor architecture it is thus difficult to establish communications according to this protocol determined with a variable number of jukebox stations to allow remote operations such as downloading of music or video following a selection by the jukebox manager or sending statistics to the center, or recovering data concerning billing or security management of the units, or recovery for analysis and survey distribution.

The object of the invention is to eliminate the various aforementioned defects of the systems of the prior art, and to provide a system of communications between jukebox units allowing reproduction and display of audiovisual digital information and a central server which supports, among various functions, downloading of data.

This object is achieved by the communications process operating in a conference mode and it includes the following stages:
    sending a heading before any transaction which includes the identity of the destination, identity of the sender, and the size of the packets;
    sending a server response in the form of a packet of data, each packet sent by the server being encoded using the identification code of the jukebox software;
    receiving a data packet by the decoding jukebox, wherein the packet at the same time checks the data received using the CRC method and sending a reception acknowledgment to the server indicating the accuracy of the received data to allow it to prepare and send a new packet to the unit destination.

According to another operating mode the server can send the data by stream, the stream including several packets, and the receiver unit will then perform decoding and storage, and after receiving the indicator of the last packet, will signal the defective packets received at the server.

According to another feature, each packet contains a first field allowing identification of the seller, a second field allowing indication of the identification of an application, this 32 bit field making it possible to specify whether it is a digital song, digital video, stationary image, software update, statistics, billing, or update of the unit database, a third field indicating the identification of a single type of application such as the identification number of the product, the type of billing, the difference between a midi song and a digital song, last block indication, finally a fourth field indicating the sequence number of the block in the transmission, a fifth block indicating the length of this block in octets, a sixth field composed of variable length data, a seventh field composed of cyclic redundancy verification data.

An object of the invention is to eliminate the various defects of the systems of the prior art by providing an intelligent digital audiovisual reproduction system which is practical to implement, compact, reliable, authorizes storage at the title level as well as easy deletion or insertion of titles not listened to or wanted, all this while maintaining performance and a high level of reproduction quality.

Another object of the invention is to provide a standard protocol which moreover allows the features mentioned above for remote updating of software.

The objects are achieved by the fact that the jukebox units contain software for interpretation of the second field of the communications packets which detect the code corresponding to remote updating of the software and after having verified that the software version number is greater than the version installed on the unit, initiates a system status verification procedure to ensure than there is no activity underway on the jukebox. If yes, the unit displays a wait message, during reception of the new software version on the screen, copies the back—up of the software version installed on the unit, modifies the system startup file for startup with the backup version, then begins execution of the new version of the software, verifies the state of system status after execution of this new version, reinitializes the system startup files for startup with the new version. In the case in which the status is not OK, the software reinitializes the system with the old version and signals a reception error to the central server.

According to another feature, each audiovisual reproduction system contains a multitask operating system which manages, using a primary microprocessor, the video task, the audio task, the telecommunications task, the input task (keyboard, screen, touch) and a status buffer is linked to each of the tasks to represent the activity or inactivity of this task.

BRIEF DESCRIPTION OF THE DRAWINGS

Other advantages and features of the invention follow from the following description, with reference to the attached drawings, given by way of a non-limiting example only, in which.

DETAILED DESCRIPTION OF THE PREFERRED EMBODIMENTS

Figure 1:
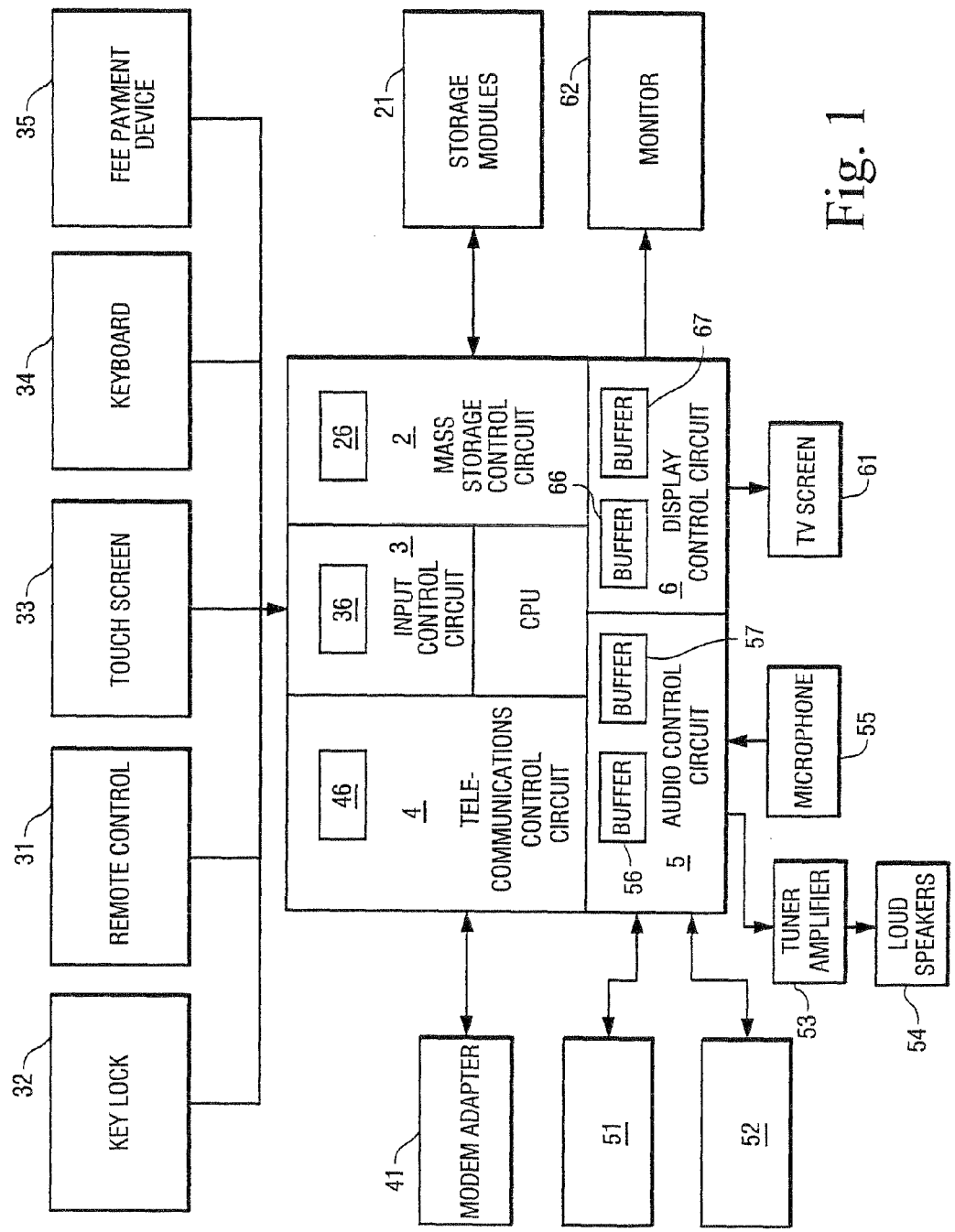
FIG. 1 shows a circuit diagram of the hardware comprising the invention.

Preferably, but in a nonrestrictive manner, the audiovisual reproduction system uses the aforementioned listed components.

Microprocessor central unit 1 is a high performance PC-compatible system, the choice for the exemplary embodiment being an Intel 80486 DX/2 system which has storage means and the following characteristics:

compatibility with the local Vesa bus,
processor cache memory: 256 kO,
RAM of 32 MO
high performance parallel and serial ports,
SVGA microprocessor graphics adapter,
type SCSI/2 bus type controller,
battery backed-up static RAM Any other central unit with similar, equivalent or superior performance can be used in accordance with the invention.

This central unit controls and manages audio control circuit (5), telecommunications control circuit (4), input control circuit (3), mass storage control circuit (2), and display means control circuit (6). The display means consist essentially of a 14 inch (35.56 cm) flat screen video monitor (62) without interleaving of the SVGA type, with high resolution and low radiation, which is used for video reproduction (for example, the covers of the albums of the musical selections), graphics or video clips.

Likewise comprising part of the storage means, storage modules (21) using hard disks of the high speed and high capacity SCSI type are connected to the storage means already present in the microprocessor device. These modules allow storage of audiovisual data.

High speed 28.8 k/bps telecommunications modem adapter (41) is integrated to authorize the connection to the audiovisual data distribution network controlled by a central server.

To reproduce the audio data of the musical selections, the system includes loudspeakers (54) which receive the signal from tuner amplifier (53) connected to electronic circuit (5) of the music synthesizer type provided to support a large number of input sources, while providing an output with CD (compact disk) type quality, such as for example a microprocessor multimedia audio adapter of the "Sound Blaster" card type SBP32AWE from Creative Labs Inc. on which two buffer memories (56, 57) are added for a purpose to be explained below.

Likewise the control circuit of the display means includes two buffer memories (66, 67) for a purpose to be explained below.

A thermally controlled 240 watt ventilated power supply provides power to the system. This power supply is protected against surges and harmonics.

The audiovisual reproduction system manages via its input controller circuit (3) a 14 inch (35.56 cm) touch screen "Intelli Touch" (33) from Elo Touch Systems Inc. which includes a glass coated board using "advanced surface wave technology" and an AT type bus controller. This touch screen allows, after having displayed on video monitor (62) or television screen (61) various selection data used by the customers, management command and control information used by the system manager or owner. It is likewise used for maintenance purposes in combination with external keyboard (34) which can be connected to the system which has a keyboard connector for this purpose, controlled by a key lock (32) via interface circuit (3).

Input circuit (3) likewise interfaces with the system a remote control set (31) composed for example of:

an infrared remote control from Mind Path Technologies Inc., an emitter which has 15 control keys for the microprocessor system and 8 control keys for the projection device.

an infrared receiver with serial adapter from Mind Path Technologies Inc.

A fee payment device (35) from National Rejectors Inc. is likewise connected to input interface circuit (3). It is also possible to use any other device which allows receipt of any type of payment by coins, bills, tokens, magnetic chip cards or a combination of means of payment.

To house the system a chassis or frame of steel with external customizable fittings is also provided.

Besides these components, wireless microphone (55) is connected to audio controller (5); this allows transformation of the latter into a powerful public address system or possibly a karaoke machine. Likewise a wireless loudspeaker system can be used by the system.

Remote control set (31) allows the manager, for example from behind the bar, access to and control of various commands such as:

microphone start/stop command,
loudspeaker muting command,
audio volume control command;
command to cancel the musical selection being played.

The system operating software has been developed around a library of tools and services largely oriented to the audiovisual domain in a multimedia environment. This library advantageously includes an efficient multitask operating system which efficiently authorizes simultaneous execution of multiple fragments of code. This operating software thus allows concurrent execution, in an orderly manner and avoiding any conflict, of operations performed on the display means, audio reproduction means as well as management of the telecommunications lines via the distribution network. In addition, the software has high flexibility.

The digitized and compressed audiovisual data are stored in storage means (21).

Each selection is available according to two digitized formats: hi-fi and CD quality.

Figure 2:
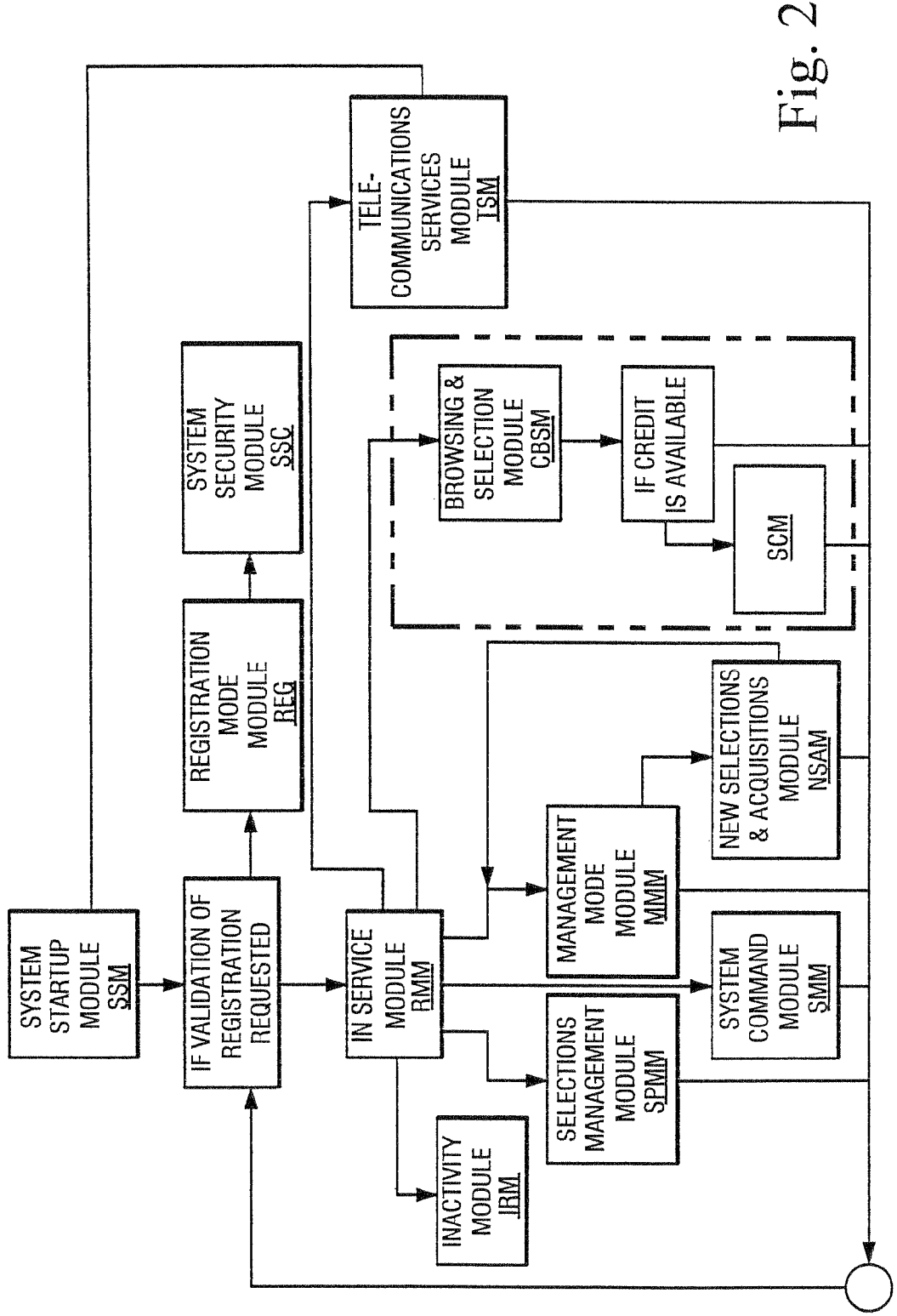
FIG. 2 shows an organizational chart of the service modules specific to a task and managed via a multitask operating system, the set of modules being included in a library stored in the storage means.

Prior to describing and reading this organization chart in FIG. 2, it must be noted that while all these modules described separately seem to be used sequentially, in reality the specific tasks of these modules are executed simultaneously in an environment using the multitask operating system. Consequently the organizational chart indicates the specific operations which the module must perform and not a branch toward this module which would invalidate all the operations performed by the other modules.

The first module, labeled SSM, is the system startup module. This module does only one thing, consequently it is loaded automatically when the system is powered up. If the system is started with a correct registration number it then directly enters the "in service" mode of the module labeled RRM.

The REG module is the registration mode module which, when it is activated for the first time or when approval for a new registration is necessary, indicates its software serial number and requests that the user enter his coordinates, such as the name of the establishment, address and telephone number.

The RMM module is the module of the "in service" mode which is the mode of operation which the system enters when its registration number has been validated. In this mode the system is ready to handle any request which can be triggered by various predefined events such as:
- customers touching the screen: when a customer or user touches the screen, the system transfers control of the foreground session to the customer browsing and selection mode CBSM module,
- telecommunications network server call requests: when the system detects a loop on the phone line, it emits an asynchronous background procedure: the telecommunications services mode TSM module,
- requests concerning key switch (32): when the manager turns the key switch the system hands over control of its foreground session to the management mode SMM module,
- reception of a remote control signal: when a command is received, it is processed in a background session by the system command 5MM module while the foreground session remains available for other interventions,
- appearance of end of timing, showing inactivity of the system: when one of the various timers is activated, control is temporarily handed over to the inactivity routines IPM module for processing.

The system remains in the "in service" mode until one of the above described events takes place.

The IRM module is the inactivity routines module. It contains the routines which perform predetermined functions such as album cover display, broadcast of parts of musical pieces present in the system, reproduction of complete selections for internal promotional proposes, audio reproductions for external promotional purposes, spoken promotional announcements of new musical selections, withdrawal to an auxiliary source which can be called when the system is inactive and when a predefined but adjustable time interval corresponding to a timer has expired.

The SMM module is the system commands module. This module allows execution of functions which command the system to accept a required input by an infrared remote control device, these functions being handled instantaneously without the process underway being stopped. A very large number of these functions are possible, only some are listed below, in a nonrestrictive manner:
- audio volume control of the played selections,
- audio volume control of the auxiliary played source,
- microphone start/stop command,
- microphone audio volume control,
- balance control, left channel, right channel,
- control of base frequency level,
- control of treble frequency level,
- command to cancel or skip a musical selection,
- panoramic effects command, zoom forward, zoom back,
- triggering of reset of the software program.

The MMM module is the management mode module. This module is triggered when the key switch is turned by the manager. The display of an ordinary screen is replaced by a display specific to system management. With this new display the manager can control all the settings which are possible with remote control. He can likewise take control of additional low level commands allowing for example definition of commands to be validated or invalidated on the remote control. He is also able to define a maximum of high and low levels for each system output source, these limits defining the range available on the remote control. Using this screen the manager can access the mode of new selection acquisitions by touching a button located on the touch screen. When the manager has succeeded in defining these commands as well as the system configuration, it is then enough to remove the key and the system returns automatically to the "in service" mode.

The NSAM module is the new selections acquisition mode module.

The CBSM module is the customer browsing and selection mode module. Access to this module is triggered from the "in service" when the customer touches the screen. The display allows the user to view a menu provided for powerful browsing assisted by digitized voice messages to guide the user in his choice of musical selections.

The TSM module is the telecommunications services mode module between the central server and the audiovisual reproduction system. This module allows management of all management services available on the distribution network. All the tasks specific to telecommunications are managed like the background tasks of the system. These tasks always use only the processing time remaining once the system has completed all its foreground tasks. Thus, when the system is busy with one of its higher priority tasks, the telecommunications tasks automatically will try to reduce the limitations on system resources and recover all the microprocessor processing time left available.

The SSC module is the system security control module. This module manages security, each system is linked to a local controller system according to a preestablished time pattern for acquisition of the approval signal in the form of the registration number authorizing it to operate. In addition, if cheating has been detected or the system cannot communicate via the network, said system automatically stops working.

The SPMM module allows management of musical selections, songs or video queued by the system for execution in the order of selection.

Finally, the SMM module allows remote management of system settings by the manager by remote control.

The multitask operating system comprises the essential component for allowing simultaneous execution of multiple code fragments and for managing priorities between the various tasks which arise.

Figure 3:
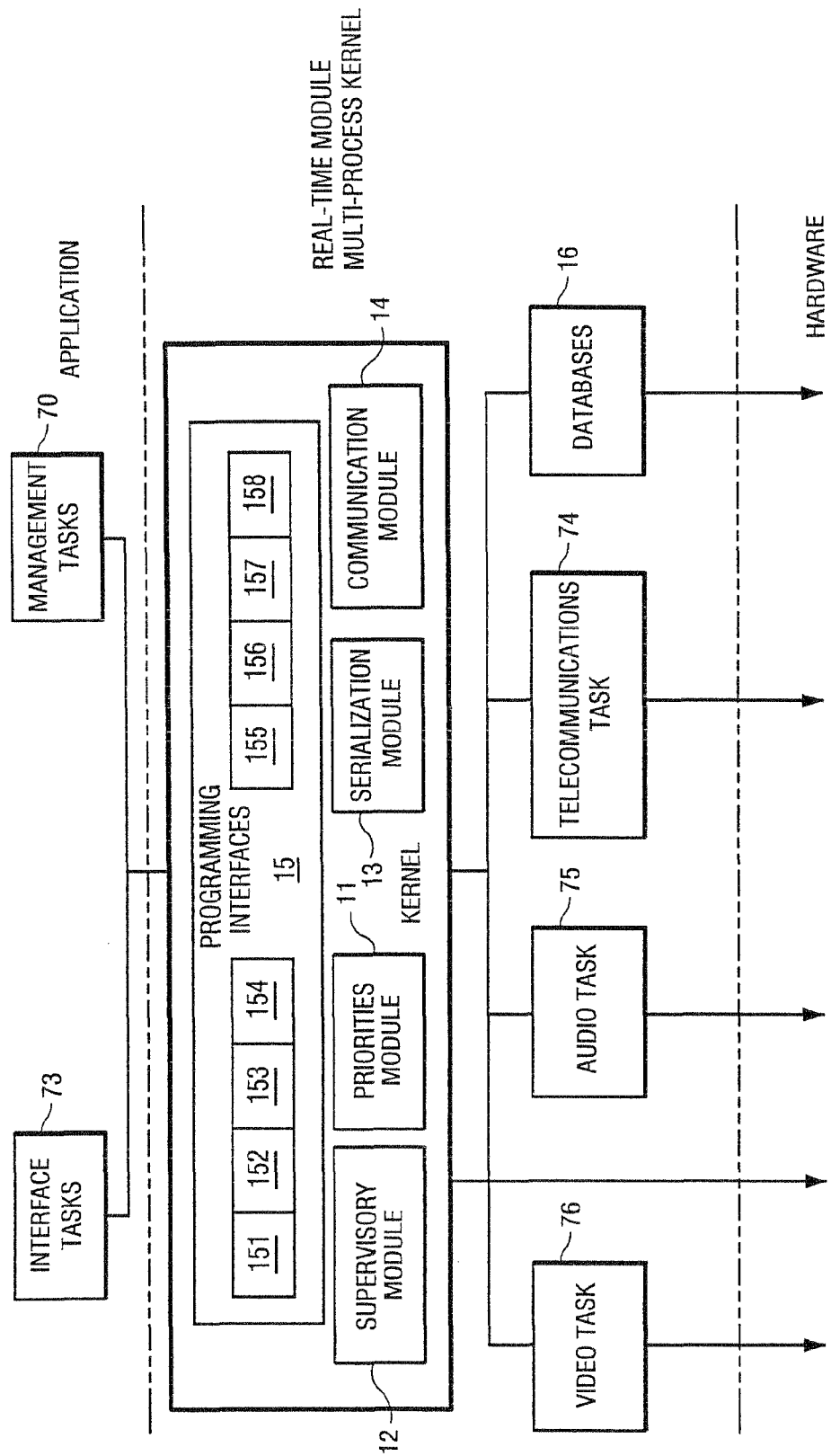
FIG. 3 shows the organization of the multitask system which manages the set of hardware and software.

This multitask operating system is organized as shown in FIG. 3 around a kernel comprising module (11) for resolving priorities between tasks, task supervisory module (12), module (13) for serialization of the hardware used, and process communications module (14). Each of the modules communicates with application programming interfaces (15) and database (16). There are as many programming interfaces as there are applications. Thus, module (15) includes first programming interface (151) for key switch (32), second programming interface (152) for remote control (31), third programming interface (153) for touch screen (33), fourth programming interface (154) for keyboard (34), fifth programming interface (155) for payment device (35), sixth programming interface (156) for audio control circuit (5), seventh programming interface (157) for video control circuit (6), and last interface (158) for telecommunications control circuit (4).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (11) as and when a task appears and disappears. Thus, as soon as a video task appears, the other tasks underway are suspended, priority is given to this task and all the system resources are assigned to the video task. At the output, video task (76) is designed to unload the video files of the mass memory (21) alternately to one of two buffers (66, 67), while other buffer (67 or 66) is used by video controller circuit (6) to produce the display after data decompression. At the input, video task (76) is designed to transfer data received in telecommunications buffer (46) to mass storage (21). It is the same for audio task (75) on the one hand at the input between telecommunications buffer (46), and buffer (26) of mass memory (21), and on the other hand at the output between buffer (26) of mass memory (21) and one of two buffers (56, 57) of audio controller circuit (5).

Figure 4:
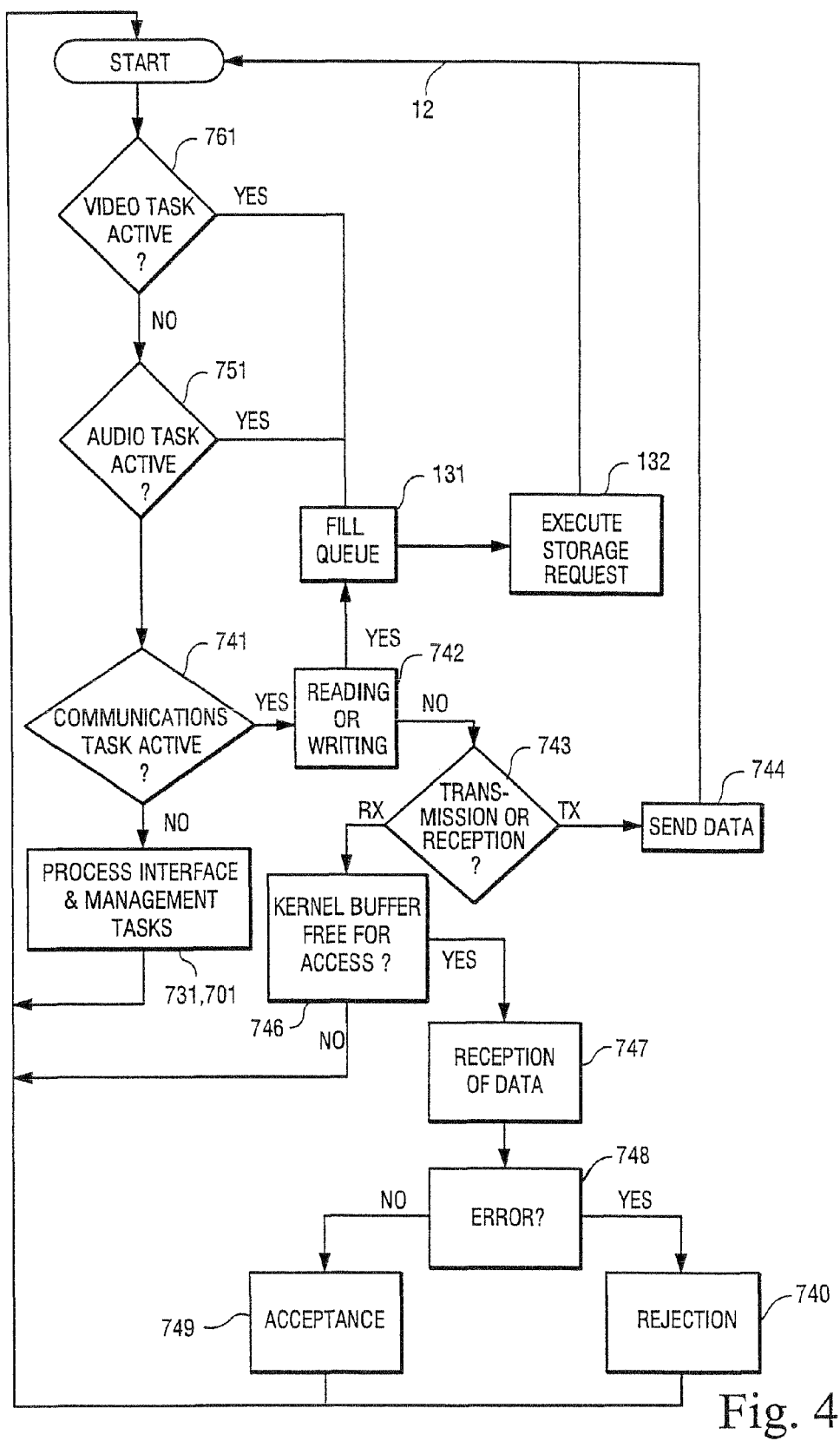
FIG. 4 shows a flowchart describing the operation of the multitask management system.

The task scheduler module will now be described in conjunction with FIG. 4. In the order of priority this module performs first test (761) to determine if the video task is active. In the case of a negative response it passes to the following test which is second test (751) to determine if the audio task is still active. In the case of a negative response third test (741) determines if the communications task is active. After a positive response to one of the tests, at stage (131) it fills memory access request queue (13) and at stage (132) executes this storage request by reading or writing in the mass storage, then loops back to the first test. When the test on communications activity is affirmative, scheduler (12) performs a test to determine if it is a matter of reading or writing data in the memory. If yes, the read or write request is placed in a queue at stage (131). In the opposite case, the scheduler determines at stage (743) if it is transmission or reception and in the case of transmission sends by stage (744) a block of data to the central server. In the case of reception the scheduler verifies that the kernel buffers are free for access and in the affirmative sends a message to the central server to accept reception of a data block at stage (747). After receiving a block, error control (748) of the cyclic redundancy check type (CRC) is executed and the block is rejected at stage (740) in case of error, or accepted in the opposite case at stage (749) by sending a corresponding message to the central server indicating that the block bearing a specific number is rejected or accepted, then loops back to the start tests. When there is no higher level task active, at stage (731 or 701) the scheduler processes interface or management tasks.

Figure 5:
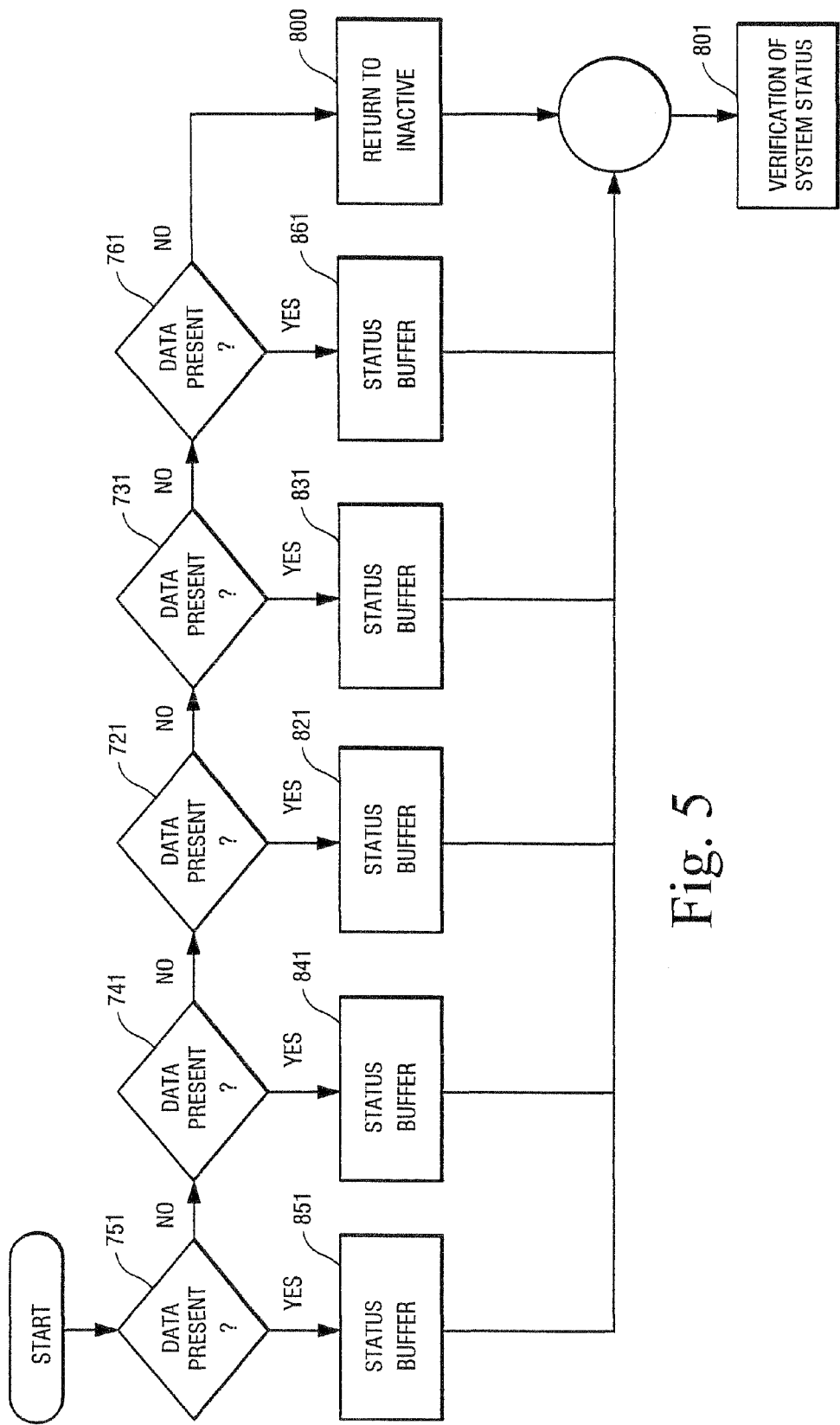
FIG. 5 shows a flowchart for verifying task activity.

Detection of an active task or ready task is done as shown in FIG. 5 by a test 721 to 761 respectively on each of the respective hardware or software buffers (26) of the hard disk, (36) of the interface, (46) of telecommunications, (56 and 57) of audio, (66 and 67) of video which are linked to each of respective controller circuits (2, 3, 4, 5, 6) of each of the hardware devices linked to central unit (1). Test (721) makes it possible to check if the data are present in the buffer of the disk input and output memory, test (731) makes it possible to check if the data are present in the buffers of the hardware or software memory buffers of the customer interface device, test (741) makes it possible to check if the data are present in the buffers of the hardware or software memory of the telecommunications device, test (751) makes it possible to check if the data are present in the buffer of the hardware or software memory for the direction, test (761) makes it possible to check if the data are present in the hardware or software memory buffers of the video device. If one or more of these buffers are filled with data, scheduler (12) positions the respective status buffer or buffers (821) for the hard disk, (831) for the interface, (841) for telecommunications, (851) for audio, (861) for video corresponding to the hardware at a logic state illustrative of the activity. In the opposite case the scheduler status buffers are returned at stage (800) to a value illustrative of inactivity.

Due, on the one hand, to the task management mode assigning highest priority to the video task, on the other hand, the presence of hardware or software buffers assigned to each of the tasks for temporary storage of data and the presence of status buffers relative to each task, it has been possible to have all these tasks managed by a single central unit with a multitask operating system which allows video display, i.e., moving images compared to a graphic representation in which the data to be processed are less complex. This use of video display can likewise be done without adversely affecting audio processing by the fact that audio controller circuit (5) includes buffers large enough to store a quantity of compressed data sufficient to allow transfer of video data to one of video buffers (66, 67) during audio processing while waiting for the following transfer of audio data.

Moreover, the multitask operating system which includes a library containing a set of tools and services greatly facilitates operation by virtue of its integration in the storage means and the resulting high flexibility. In particular, for this reason it is possible to create a multimedia environment by simply and efficiently managing audio reproduction, video or graphics display and video animation. In addition, since the audiovisual data are digitized and stored in the storage means, much less space is used than for a traditional audiovisual reproduction system and consequently the congestion of the system according to the invention is clearly less.

Figure 6:
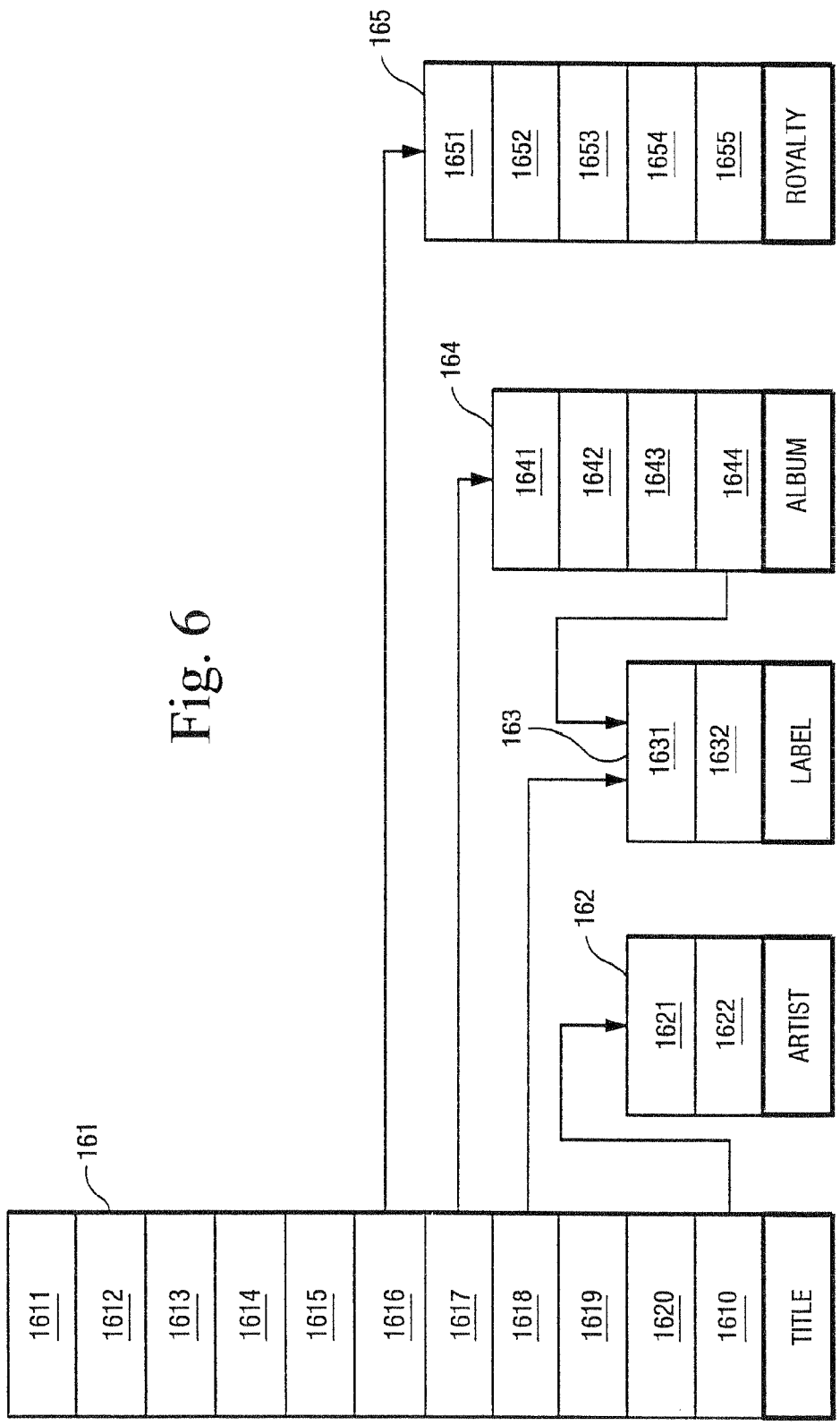
FIG. 6 schematically shows the database structure.

Database (16) is composed, as shown in FIG. 6, of several bases: first (161) with the titles of the audiovisual pieces, second (162) with the artists, third (163) with the labels, fourth (164) with albums, fifth (165) with royalties. First base (161) contains first item (1611) giving the title of the piece, second item (1612) giving the identification of the product, this identification being unique. Third item (1613) makes it possible to recognize the category, i.e., jazz, classical, popular, etc. Fourth item (1614) indicates the date of updating. Fifth item (1615) indicates the length in seconds for playing the piece.

Sixth item (1616) is a link to the royalties base. Seventh item (1617) is a link to the album. Eighth item (1618) is a link to the labels. Ninth item (1619) gives the purchase price for the jukebox manager;

Tenth item (1620) gives the cost of royalties for each performance of the piece;

Eleventh item (1610) is a link to the artist database, This link is composed of the identity of the artist. The artist database includes, besides the identity of the artist composed of item (1621), second item (1622) composed of the name of the artist or name of the group. The label database includes first item (1631) composed of the identity of the label, establishing the link to eighth item (1618) of the title database and second item (1632) composed of the name of the label. The album database contains first item which is the identity of the album (1641) which constitutes the link to seventh item (1617) of the title base. Second item (1642) comprises the title, third item (1643) is composed of the date of updating of the album, and fourth item (1644) composed of the label identity. The royalty base is composed of first item (1651) giving the identity of the royalty and corresponds to sixth item (1616) of the title base. Second item (1652) comprises the name of the individual receiving the royalties. Third item (1653) is composed of the destination address of the royalties. Fourth item (1654) is composed of the telephone and fifth item (1655) is composed of the number of a possible fax.

Figure 7:
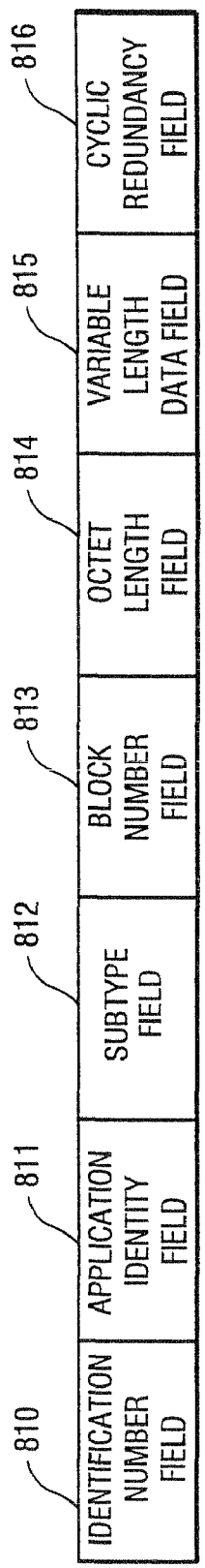
FIG. 7 shows the structure of the packets used in the communications protocol.
Figure 8:
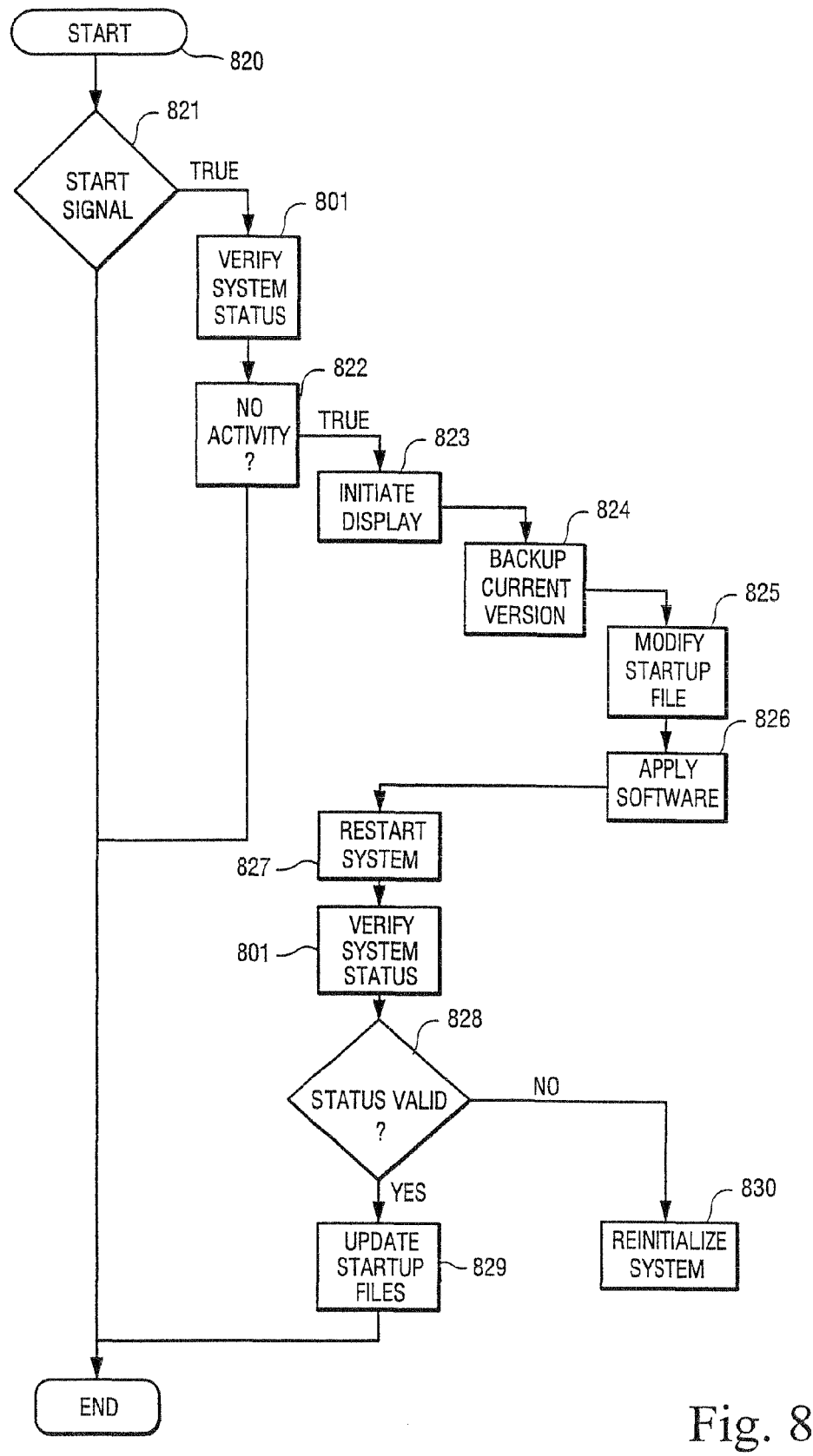
FIG. 8 shows a method of updating the software which can be done using the invention protocol.

It is apparent that this database (16) thus makes it possible for the manager to keep up to date on costs, purchases of songs and royalties to be paid to each of the artists or groups of artists performing the songs or videos, this provided that a communications protocol allows loading of the songs and modification of the content of the database depending on the songs loaded and allows communications with the central server by uploading or downloading the corresponding information. This communication protocol is composed of a first stage during which the center requests communication with the unit to which the communication is addressed. The unit decodes the heading sent by the center and if it recognizes it, indicates to the center if it is available or not depending on the state of its system status determined as explained above. If it is not available the center will then send a new request. If it is available, the center begins to send a first data block and the following blocks in succession. Each of the blocks is composed of a plurality of fields as shown in FIG. 7. First field (810) indicates the identification number of the seller; this allows multiple sellers to share a single communications link with the central site. Second field (811) indicates the application identity and makes it possible to distinguish between a digital song, a digital motion video, a stationary video or an stationary digital graphical image, allows updating of software, transmission of statistics, billing, updating of the database, transmission of surveys. Third field (812) makes it possible to identify a subtype of application such as the identity number of the product, type of billing, indication of a song in the MIDI standard or a digital song, or finally indication of whether it is the last block of a transmission. The following field (813) makes it possible to recognize the number of the block assigned sequentially to the block in this transmission. Fourth field (814) makes it possible to recognize the octet length of each transmission block. Fifth field (815) makes it possible to recognize variable length data of the transmission and sixth field (816) contains cyclic redundancy verification information which allows the jukebox to verify that there has not been any error in transmission by recomputing the values of this information from the received data. The data are coded with the identification number of the receiving station, i.e., the number of the jukebox; this prevents another station from receiving this information without having to pay royalties. This is another advantage of the invention because in the processes of the prior art it is not exactly known which stations have received messages and at the outside a cheat could indicate that the information has not been correctly received to avoid having to pay the royalties. Here this operation is impossible since the cheat does not have access to his identification number known solely by the computer and encoding done using this secret identification number makes it possible to prevent cheating and reception by other units not authorized to receive the information. Finally it can be understood that this protocol, by the information which the blocks contain, allows high flexibility of use, especially for transmitting video images or digitized songs, or again to allow updating of software as explained below according to the process in FIG. 8. In the case of software updating, the central system sends at stage (821) a first start signal allowing the jukebox for which it is intended to be recognized by its identification number and to indicate to this jukebox the number of the software version. At this stage (821) the jukebox then performs an initial verification to ensure that the version number is higher than the number of the versions installed and then initiates the process of verification of the system status indicated by stage (801). This verification process has already been described with reference to FIG. 7. In the case in which at stage (822) there is no system activity, at stage (823) the jukebox initiates display of a waiting message on the display device to prevent a user from interrupting the communication, and during this time receives the data composed of the new software to be installed. At stage (824) the unit backs up the current version and at stage (825) the unit modifies the startup file for startup with the backup version. After having completed this modification the unit at stage (826) applies the software received to the system software and restarts the system software at stage (827). After having restarted the system, the unit reverifies status (801) and at stage (828) determines if the system statuses are valid or not. In the case in which no errors are detected, at stage (829) the unit updates the startup files with the newly received version and returns to a waiting state. If an error is detected, the unit reinitializes the system at stage (830). Once installation is completed, the unit awaits occurrence of an event representative of a task in order to handle its tasks as illustrated above.

Due to the flexibility of the multitask system and its communications protocol, each unit of the jukebox can thus be selected independently of the units connected to the network and can update the databases or the version of the desired song or again the software version without disrupting the operation of the other units of the network and without having to wait specifically for all the units of a network to be available. This is independent of the modems used which can be of the high speed type for a standard telephone line or a specialized modem on a dedicated data link or a SDN modem for fiber optic transmission or again an IRD modem for satellite connection.

If one or more packets are not received correctly by the jukebox during transmission, it does not interrupt transmission since other jukeboxes can also be in communication. However when communication is stopped by the central server, each jukebox which has had a incident takes a line and signals the numbers of the packets not received to the center. This allows the center to resend them. If registration of one or more songs or videos or part of a song or video has not be done due to lack of enough space on the disk or storage means, the system of each jukebox signals to the manager by a display or audio message the packet number if it is part of a song or a video, or the numbers of the song or video which have not be registered for lack of space. This allows the manager, after having decided to erase certain songs or videos from the hard disk, to again request that the center send these songs or videos or the part not received.

Any modification by one skilled in the art is likewise part of the invention. Thus, regarding buffers, it should be remembered that they can be present either physically in the circuit to which they are assigned or implemented by software by reserving storage space in the system memory.

What is claimed is:

1. A jukebox system, comprising:
a plurality of jukebox devices, each said jukebox device including a microprocessor, a memory that stores songs playable via the jukebox device in response to requests by a user, a touchscreen display for displaying images, an audio arrangement configured to provide audio, a communication system enabling the jukebox device to communicate with a song distribution network, and a multitasking operating system that enables simultaneous operation of the microprocessor, the display, the audio arrangement, and the communication system, and further wherein each said jukebox device includes security operating software that controls operation of said jukebox;
a server system remote from said plurality of jukebox devices and a controller system accessible by each said jukebox device through said distribution network;
a system management function configured to enable an authorized manager of each said jukebox device to access and selectively adjust adjustable operation settings for the respective jukebox device, a plurality of the adjustable settings being adjustable over a range predetermined by the authorized manager through the definition of high and low levels for each system output source; and wherein individual ones of said plurality of jukebox devices are caused to be registered for operation through communication between the security operating software of the respective jukebox device and the controller system, the security operating software either (1) authorizing the respective jukebox device to operate when the authorized manager has processed a correct registration, or (2) causing the respective jukebox device to at least temporarily stop working if the network cannot be accessed.

2. The system of claim 1, wherein each said jukebox is further configured to:

download songs from the server system for storage thereon, display, on the display thereof, images of album covers that correspond to songs that are stored on the respective jukebox device, and collect money or credits through the respective jukebox device from patrons in exchange for playing selected songs via the respective jukebox device, wherein one or more desired songs are selectable by having the patrons interact with the respective jukebox device.

3. The system of claim 2, wherein each said jukebox is further configured to upload royalty information from the respective jukebox device to the server system for use in accounting for music rights associated with the selected songs.

4. The system of claim 2, wherein each said jukebox is further configured to:

receive update data from said server system on the respective jukebox device to remotely update said operating software thereon, and upon receipt of said update data, update the respective jukebox device to operate in accordance with new operating software.

5. The system of claim 4, wherein each said jukebox is further configured to:

determine, upon receipt of said update data, whether a version number of current software is outdated, and when said version number is determined to be outdated, perform a back-up of the current operating software, modify a system startup file for startup with the back-up of the current software, begin execution of a new version of said software received from said server system, verify proper operation of said new version of said software and, if said new version properly operates, reinitialize the system startup file for startup with the new version.

6. The system of claim 5, wherein each said jukebox is further configured to reinitialize said current version of said software and send an error message to said server system when said verification of said new version indicates an error.

7. The system of claim 1, wherein the server system is configured to encode songs with a code number resident in each said jukebox device before distributing any songs from the server system to the jukebox device.

8. The system of claim 1, wherein the registering of the jukebox devices with the controller system includes transmission to the respective jukebox device of an approval signal in the form of a registration number that the respective jukebox device is to check upon each startup, the respective jukebox device being rendered operational when a correct registration number is found.

9. The system of claim 1, wherein a centrally located database includes royalty base and song cost information.

10. A jukebox device, comprising:

a microprocessor;

a memory that stores songs playable via the jukebox device in response to requests by a user;

a touchscreen display for displaying images;

an audio arrangement configured to provide audio;

a communication system configured to enable the jukebox device to communicate with a song distribution network; and a multitasking operating system that enables simultaneous operation of the microprocessor, the display, the audio arrangement, and the communication system, wherein said jukebox device includes security operating software that controls operation of said jukebox, wherein the jukebox device is connected to a jukebox system including a plurality of other similarly configured jukebox devices, and a server remote from the jukebox device and the other jukebox devices, and further comprising: adjustable operation settings for the jukebox device, the adjustable operation settings being adjustable over a range predetermined by an authorized manager of the jukebox device through the definition of high and low levels for each system output source, and wherein the jukebox device is caused to be registered for operation through communication between the security operating software of the jukebox device and the controller system, the security operating software either (1) authorizing the jukebox device to operate when the authorized manager has processed a correct registration, or (2) causing the jukebox device to at least temporarily stop working if the network cannot be accessed.

11. The jukebox device of claim 10, wherein said jukebox device is further configured to:

download songs from the server for storage thereon, display, on the display thereof, images of album covers that correspond to songs that are stored thereon, and collect money or credits from patrons in exchange for playing selected songs via the jukebox device, wherein one or more desired songs are selectable by having the patrons interact with the jukebox device.

12. The jukebox device of claim 11, wherein said jukebox device is further configured to upload royalty information from the jukebox device to the server for use in accounting for music rights associated with the selected songs.

13. The jukebox device of claim 11, wherein said jukebox device is further configured to:

receive update data from said server to update said operating software on the jukebox device, and upon receipt of said update data, update the jukebox device to operate in accordance with new operating software.

14. The jukebox device of claim 13, wherein said jukebox device is further configured to:

determine, upon receipt of said update data, whether a version number of current software is outdated, and when said version number is determined to be outdated, perform a back-up of the current operating software, modify a system startup file for startup with the back-up of the current software, begin execution of a new version of said software received from said server, verify proper operation of said new version of said software and, if said new version properly operates, reinitialize the system startup file for startup with the new version.

15. The jukebox device of claim 14, wherein said jukebox device is further configured to reinitialize said current version of said software and send an error message to said server when said verification of said new version indicates an error.

16. The jukebox device of claim 10, wherein the server is configured to encode songs with a code number resident in said jukebox device before distributing any songs from the server to the jukebox device.

17. The jukebox device of claim 10, wherein the registering of the jukebox device with the controller system includes transmission to the jukebox device of an approval signal in the form of a registration number that the jukebox device is to check upon each startup, the jukebox device being rendered operational when a correct registration number is found.

18. The jukebox device of claim 10, wherein a centrally located database includes royalty base and song cost information.

* * * * *